No. 733,859. PATENTED JULY 14, 1903.
J. W. MAXWELL & J. W. SAWYER.
PROCESS OF EXTRACTING PRECIOUS METALS FROM THEIR ORES.
APPLICATION FILED AUG. 3, 1901.
NO MODEL.
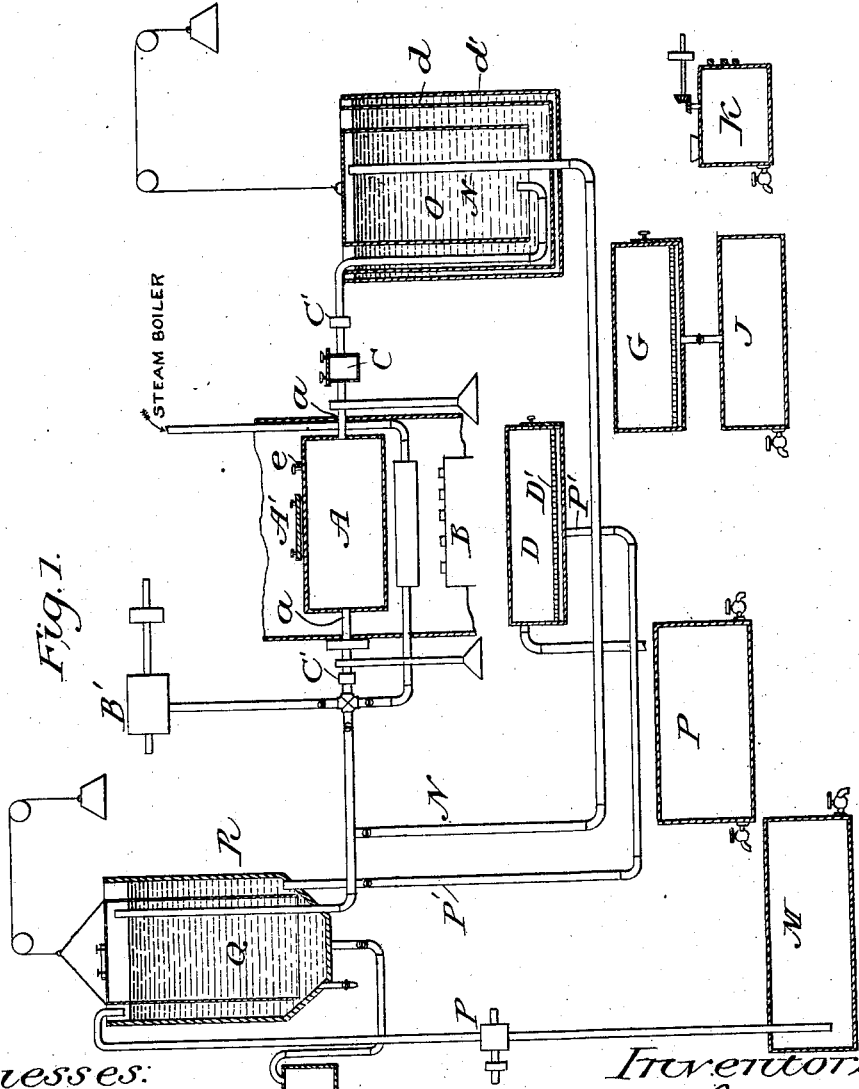

No. 733,859. Patented July 14, 1903.

UNITED STATES PATENT OFFICE.

JOSEPH WYLIE MAXWELL AND JOHN WILLIAM SAWYER, OF LOUISVILLE, KENTUCKY.

PROCESS OF EXTRACTING PRECIOUS METALS FROM THEIR ORES.

SPECIFICATION forming part of Letters Patent No. 733,859, dated July 14, 1903.

Application filed August 3, 1901. Serial No. 70,835. (No specimens.)

*To all whom it may concern:*

Be it known that we, JOSEPH WYLIE MAXWELL and JOHN WILLIAM SAWYER, citizens of the United States, and residents of Louisville, in the county of Jefferson and State of Kentucky, have invented a new and useful Process of Extracting the Precious Metals from Refractory Ores, of which the following is a specification.

This invention relates to a new and useful process of extracting the precious metals from refractory ores; and we declare the following to be a full and exact description of the invention, to enable others skilled in the art to which it appertains to make and use the same.

The object of our invention is to entirely extract the precious metals and other values from their refractory ores economically and expeditiously and to obtain a bullion of the highest grade and to expeditiously extract the base metals and metalloids, and, in conjunction with suitable apparatus, such as herein described and shown, to provide against and prevent the losses of the precious metals and other values that occur in the use of other processes used for extracting the precious metals and other values from their refractory ores and to prevent the loss of the excess of reagents used in extracting the same and to provide for their reuse.

The objects of our invention are accomplished by the course of treatment consisting of the following steps: First, by extracting and removing the metalloids from the ore and ore-treating receptacle by means of heat, oxygen from a current of air or from any other source, and a continuous and rapid current of dry and hot chlorin gas and nascent chlorin under superatmospheric pressure and chloridizing and volatilizing and condensing the metalloid compounds and any other vapors formed in this step of the process and collecting for reuse the excess of chlorin gas used in this step of the process in conjunction with the use of suitable apparatus; second, by chloridizing and volatilizing and removing the floured and fine free gold from the ore and ore-treating receptacle, by chloridizing the fine and floured gold and volatilizing the chlorid of gold formed and carrying it out of the ore and ore-treating receptacle by means of a continuous and rapid current of dry and hot chlorin gas under superatmospheric pressure at a proper temperature, as herein more fully specified and described; third, by chloridizing and volatilizing the base metals contained in the ore by the same means of a continuous and rapid current of dry and hot chlorin gas under superatmospheric pressure at a proper temperature, as herein specified, and removing their volatilized chlorids from the ore and ore-treating receptacle in whole or in part by and in a continuous and rapid current of dry and hot chlorin gas under superatmospheric pressure as used in the preceding step for extracting floured or fine gold; fourth, by decomposing the film on rusted gold present in the finely-powdered dry ore by a current of hot hydrogen and superheated steam under superatmospheric pressure, which also removes excess of chlorin in the ore and ore-treating receptacle and prepares the finely-powdered dry ore for the following step; fifth, by treatment with hot vapor of mercury under superatmospheric pressure to reach and amalgamate fine or floured gold remaining after the previous treatment with hot hydrogen and superheated steam; sixth, by dissolving in chlorin-water the dry soluble chlorids formed by the previous dry chlorinating treatment and chloridizing and dissolving any precious or base metals not affected by the previous treatment and extracting and removing them from the pulp by solution and filtration or leaching and separating the metals of the chlorids in solution from each other by precipitation and filtration by the use of appropriate apparatus and analytical reagents well known to the art; seventh, by removing the insoluble chlorid of silver by a solution of hyposulfite of an alkali or alkaline earth or a saturated solution of chlorid of sodium; eighth, by extracting the remaining free coarse gold by amalgamation in the usual way and by means of ordinary devices. The mercury is then drawn from the amalgamating device and filtered and the amalgam retorted and the pure gold melted and cast into bullion of the highest grade. The losses that occur in other processes by volatilization are prevented by the use of suitable apparatus, as shown in the accompanying drawings and herein specified and described, to condense and collect all the volatilized and condensed values produced in this process. The excess of chlorin used in each step is collected and stored for reuse by appropriate apparatus of ordinary construction and in common use, such as is used for collecting and storing illuminating-gas and as shown in the accompanying drawings. The remaining chlorin-water used to dissolve the soluble precious and base metal chlorids is stored for reuse in appropriate apparatus, as herein specified. The solvent solution used to dissolve the chlorid of silver in a like manner is stored for reuse and is reinforced as may be required by the addition of the solvent used. The excess of mercury used in the process of amalgamation is recovered for reuse by filtration and retorting the amalgam in the usual way.

The nature of the first three steps of our process consists in the use of chlorin to combine with the precious and base metals and metalloids contained in their ores and form with them volatilizable compounds that are volatilized when heated to the degree of temperature at which the several compounds formed are volatilized and while in the volatilized state and under proper conditions of dryness and temperature and pressure and suitable apparatus to maintain the volatilized compounds in the volatilized state, then subjecting them to the action of a continuous, full, and rapid current of dry and hot chlorin gas and nascent chlorin under superatmospheric pressure to maintain the volatilized precious and base metal compounds and compounds of the metalloids in the volatilized state and to serve as a carrier to carry all the volatilized compounds formed out of the ore and ore-treating receptacle A and in conjunction with suitable apparatus, condensing and collecting them and subsequently treating them as required to obtain the precious and base metals contained in the product in the metallic state or any other state required. The use of the continuous and rapid current of dry and hot chlorin gas under superatmospheric pressure may be continued in conjunction with suitable apparatus, as herein specified and described, until all the precious metals and other values are entirely removed from the ore and ore-treating receptacle and all the excess of reagents be recovered for reuse.

To economize the time of the process and amount of chlorin required to chloridize and volatilize the metalloids, the fine gold, and the base metals and coarse gold and as a continuous current to carry the chloridized and volatilized values out of the ore and ore-treating receptacle A, we use the chlorin under such conditions as dryness and a continuous and rapid-moving current under superatmospheric pressure and at such temperatures as herein specified, that cause the chlorin to act more efficiently and rapidly on the respective constituents of the ore to which it is applied and in the particular manner suited to their nature and condition as used and applied in this process. The rapid removal of the metalloids being a very essential part of the process, chlorin, as nascent chlorin, is used in conjunction with the free, dry, and hot chlorin, moving as a continuous and rapid current under superatmospheric pressure to quickly and effectually volatilize and remove them from the ore and ore-treating receptacle and at such a temperature that the chlorin will not attack the base metals or silver, if other constituents of the ore. To energetically and rapidly attack the fine and floured gold, we use the above-described current at the temperature stated, because the fine and floured gold is more effectually and rapidly chloridized and volatilized and carried out of the ore and the ore-treating receptacle by such treatment, while the base metals and silver are not attacked. The use of oxygen as used in the previous step to hasten the removal of the metalloids is discontinued in this the second step. As the temperature rises to 360° Fahrenheit and slowly to about 755° Fahrenheit the base metals are thoroughly chloridized and volatilized and wholly or in part carried out of the ore and ore-treating receptacle according to the nature of the ore. When the temperature of about 755° Fahrenheit is reached and maintained for the time herein specified in conjunction with the continuous and rapidly-moving current of chlorin gas and rotating barrel A, the silver will be chloridized and volatilized and removed from the ore and ore-treating receptacle in whole or in part, according to the nature of the ore. The treatment with hot hydrogen gas and superheated steam, as already stated, is to remove the base-metal compounds deposited on gold as a film, constituting rusted gold, by its reducing action. The treatment with vaporized mercury is to reach and amalgamate floured gold and to prepare coarse gold for amalgamation by covering it with a film of mercury. The treatment of the products of the previous treatment remaining in the ore and ore-treating receptacle with chlorin-water and other solvents by solution, filtration, and precipitation, and finally by amalgamation is to economize time and expense and insure the entire and complete extraction of all the precious metals and other values contained in the ore, as herein set forth.

In a further description of our invention the following reference is made to the accompanying drawings.

Similar letters of reference are used to indicate similar parts.

Figure 1 is a plain sectional drawing of the apparatus used to carry out the details of our invention, in which A represents an ordinary rotatable ore-treating barrel. T is an ordinary device for generating chlorin by treating in it chlorid of lime with sulfuric acid and water in the usual way. Q is a device in which chlorin is collected and stored for use, such as is ordinarily used for collecting and storing illuminating-gas. R is a tank for holding the chlorin-water which is produced when the chlorin is generated in the chlorin-generator T and collected by displacement of water in the reservoir Q, in which the chlorin gas is stored for use. O is a similar device for collecting the excess of chlorin which has passed through the ore-treating barrel A and in which the vapors formed in the rotatable barrel A, that condense at a low temperature, are condensed. C on the trunnion $a$ is a condenser in which the vapors formed in the ore-treating barrel A, which condense at a high temperature, are condensed. B is a blower for furnishing a current of air. S is a connecting-pipe from a steam-generator. (Not shown.) Said pipe conveys steam to the device H for generating hydrogen and superheated steam. Also connecting-pipes, with stop-cocks or valves, are shown, which connect the chlorin-generator T with the chlorin-reservoir Q, and the chlorin-reservoir Q with the rotatable ore-treating barrel A, and the barrel A with the device O for collecting and storing the excess of chlorin used and the vapors produced, that condense at a low temperature, and to connect the dissolving-vat G for the solution of chlorid of silver with the precipitating-vat J. K is a settler used for the purpose of amalgamation, which is the last step of this process.

Fig. 2 is for the purpose of showing the position of the ore-treating barrel A when its contents are emptied into the dissolving-vat D, which has a perforated false bottom D', covered with burlap or its equivalent. The vat D is for the purpose of dissolving, filtering, or leaching the chlorids produced by the preceding chloridizing process. The vats D P M Q $d$ are lined with lead.

In carrying out the details of our invention by means of the apparatus described we proceed as follows: The dry ore being finely pulverized by any of the well-known methods and machinery in use for this purpose, the dry powdered ore that will pass through a mesh of sixty (60) to one hundred (100) to the square inch is mixed with chlorid of sodium in the proportion of ten (10) to twelve (12) pounds to the ton of dry pulverized ore and then placed into the rotatable ore-treating barrel A through its manhole A'. The manhole is then closed gas-tight, and the barrel A is then connected with the blower B, by means of its connecting-pipe, to furnish a current of air to the ore in the barrel A. The stop-cock on the pipe from the device H in the furnace B being closed, the force of the current of air is regulated by the stop-cock on its connecting-pipe. When vapor of water or other vapors, such as oleaginous vapors, cease to be formed and the powder is dry, the stop-cock on the pipe connecting the chlorin-reservoir Q with the barrel A is opened and chlorin forced continuously and rapidly into and through the barrel A, the trunnion $a$, and condenser C, and thence into the gas-holder O, carrying with it the volatilized compounds formed in the barrel A. The pressure in the barrel A is increased or diminished by the degree to which the cock on the connecting-pipe which connects the chlorin-reservoir Q with the barrel A is opened or closed, the chlorin in Q having been collected under pressure, and by the cock on the pipe which enters the tank $d$, or it may be increased by adding weights to the reservoir gas-holder Q. The barrel A is then rotated over the furnace B by means of a pulley on the approximate trunnion $a$ at the rate of three (3) or four (4) times a minute and is uniformly heated to about 180° Fahrenheit. The temperature and the rapid continuous current of hot and dry chlorin gas and nascent chlorin and current of air and the superatmospheric pressure are maintained and continued one (1) to two (2) hours, according to the nature of the ore. The oxygen of the current of air oxidizes the sodium of the chlorid of sodium, forming soda, and at the same time liberates nascent chlorin. Sulfur, if present, is oxidized, forming sulfurous oxid, and ultimately is oxidized by the oxygen of the current of air to sulfuric acid, which combines with the soda and forms sulfate of soda. Equation:

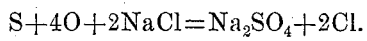

$$S + 4O + 2NaCl = Na_2SO_4 + 2Cl.$$

The nascent chlorin, with that of the dry hot chlorin, flowing as a rapid current under superatmospheric pressure quickly combines with the metalloids. The chlorids produced being vaporized are rapidly carried out of the dry powdered ore and ore-treating barrel A. Any chlorid of gold formed and volatilized in this step of our process is condensed and collected in the condenser C or other suitable device. The compounds of the metalloids, which condense at a low temperature, are carried by the rapid continuous current of hot and dry chlorin gas under superatmospheric pressure through the condenser C on the hollow trunnion $a$ and by its connecting-pipe into the condensing-tank $d$ and gas-holder O and are condensed and collected in the same. The excess of reagents used and the products of this step may be separately collected in a similar device specially provided for this step. The excess of chlorin collected in the gas-holder O is forced by any convenient means through its connecting-pipe N and N', its stop-cock being open, and into the chlorin-reservoir Q for reuse or into a separate reservoir provided to receive and store it for reuse. Then we proceed by raising the temperature to 360° Fahrenheit and then slowly raising it to about 755° Fahrenheit, which is maintained one-half ($\frac{1}{2}$) to two (2) hours, according to the nature of the ore. The barrel A is rotated three (3) or four (4) times a minute, and the continuous, full, and rapid current of dry and hot chlorin gas under superatmospheric pressure is continued and applied to the finely-powdered dry ore at the temperature and for the time above stated. The flow of the current of chlorin under the conditions above specified should be full, continuous, and as rapid as is possible without blowing the dry powdered ore out of the ore-treating barrel A. By the uniform, continuous, full, and rapid current of dry and hot chlorin gas under superatmospheric pressure and at the temperature as stated we hasten the result of chloridizing the base metals and volatilizing of the base-metal chlorids and the chloridizing of the silver and the removal of their chlorids and any other vapors formed by this treatment from the ore and ore-treating barrel A or other ore-treating receptacle. The metallic silver and chlorid of silver and base-metal chlorids not extracted by this treatment are subsequently removed from the ore and ore-treating receptacle used by solution and filtration or leaching, as more fully described in the following specification. The chlorids produced and volatilized during this treatment of the ore are condensed and collected in the condenser C, and the excess of chlorin is collected in the gas-holder O, and the excess of chlorin collected in the gas-holder O is forced back into the reservoir Q or into another similar device for storing the same. The finely-powdered dry ore at the same temperature of the last step is then treated with hot hydrogen and superheated steam by admitting steam from the engine-boiler or other steam-generator by means of the pipe S, which connects with the device H in the furnace B. The device H, containing scrap-iron, is then heated to a red heat. The steam in contact with the red-hot iron is decomposed, being water in a state of vapor and composed of two (2) atoms of hydrogen and one (1) of oxygen, ($H_2O$.) The oxygen of the water combines with the red-hot iron and forms the black oxid of iron, and the hydrogen is set free. Four (4) molecules of water reacting with three (3) atoms of iron forms one (1) molecule of black oxid of iron and eight atoms of hydrogen, which is expressed by the chemical equation:

$$4H_2O + Fe_3 = Fe_3O_4 + H_8.$$

The hydrogen set free and the excess of superheated steam pass on through the pipe H', the cock on it being opened and the cocks on the other pipes connecting with the proximal trunnion $a$ being closed, into the trunnion $a$ and thence into the ore-treating barrel A. The hydrogen, superheated steam, and any vaporized values present pass into the condenser C, the vaporized values are condensed, and the hydrogen and steam pass into the water of the condenser $d$, where the steam is condensed, and by turning the delivery-pipe from under the gas-holder O the hydrogen is allowed to escape. The hydrogen may be collected and stored and used to reduce the black oxid of iron to the metallic state by passing it through the device H, holding the black oxid of iron at a red heat, steam being reproduced.

$$Fe_3O_4 + H_8 = Fe_3 + 4H_2O.$$

By the reducing action of the hot hydrogen and superheated steam the film of rusted gold not removed by previous treatment and the film of chlorid of silver which may be deposited on the free gold during the process of chlorinating the silver are removed. The treatment with hydrogen and superheated steam and rotation of the ore-treating barrel A is continued for one-half ($\frac{1}{2}$) hour. Then the supply of hydrogen and superheated steam is stopped by closing the stop-cock on the pipes S and H, and the rotation of the ore-treating barrel A is stopped, and the iron cock E or other device on the barrel A is opened and one pound (1 lb) of mercury to the ton of powdered dry ore is introduced into the barrel A, and the cock E is then closed and the barrel A rotated three (3) or four (4) times a minute, the temperature being not less than 662° Fahrenheit to 680° Fahrenheit and the temperature maintained for about one-half ($\frac{1}{2}$) hour, all the cocks on the pipes connected with the barrel A being closed to prevent the escape of the vaporized mercury or its chlorids. The furnace-fire is then drawn, and the rotating barrel A is stopped and cooled below 212° Fahrenheit by a current of air from the blower B, which is passed through the ore-treating barrel A into the water of the condenser $d$, and the vapors accompanying the current of air from the barrel A being condensed the air is allowed to escape by turning the end of the pipe in the tank $d$ from under the gas-holder O, or the barrel A may be cooled by a current of air from the blower B, applied externally by any means most convenient. When cooled below 212° Fahrenheit, the manhole A' is opened and the ore-treating barrel A is turned into the position shown by Fig. 2. The pulp is then removed into the vat D through the chute L. Chlorin-water is then conveyed into the vat D by opening the cock on its connecting-pipe $p'$ $p'$ $p'$. The chlorin-water from the reservoir R passes up into the vat D and through the perforated bottom D' and its burlap covering or of other suitable material until it is uniformly distributed through the pulp. It is then allowed to stand after the vat D is nearly filled with the chlorin-water until the powdered ore has settled and the solution has become clear. It is then allowed to slowly overflow into the precipitating-tank P until the overflowing chlorin-water ceases to indicate the presence of the soluble chlorids of the metals contained in the ore according to its assay by the use of appropriate tests known to the art. When the overflowing chlorin-water ceases to produce a metallic film on bright copper wire or polished iron or a colored precipitate with an alkaline sulfid or any other reagents indicating the absence of the metal or metals in solution, the washing is then complete. By these means the soluble chlorids formed by the previous treatment with dry chlorin and those formed by the chemical action of the chlorin-water are removed from the pulp. The chlorid of silver being insoluble in the chlorin-water remains in the pulp and is removed subsequently by an appropriate solvent and filtration or leaching and precipitation, as in the seventh step. The filtrate in the vat P containing the soluble chlorids may be treated then with a saturated solution of monosulfid or disulfid of soda until it ceases to produce a precipitate, and when the precipitate has settled the filtrate is emptied into the vat M, from which it is pumped back into the chlorin-water reservoir R to be reused and the precipitate collected as a concentrate, or the dissolved chlorids in the vat P may be first treated with a solution of protosulfate of iron to extract the gold in its metallic state. The solution of protosulfate of iron is added to the solution of the chlorids in the vat P until it ceases to produce a precipitate, and when the precipitate has settled the supernatent solution is decanted into the vat M, and the mercury contained in it is precipitated in the metallic state by scrap-iron and collected and purified by retorting it. Then the solution is conveyed into a precipitating-vat provided for the purpose and treated with scrap-iron, and copper contained in the solution is precipitated in the metallic state. The number of precipitating-vats depends on the number of values in the ores. Lead is precipitated by sulfuric acid as sulfate of lead and zinc as carbonate of zinc by an alkaline carbonate. The pulp is then removed from the filtering-vat D by shoveling and raking it through the gate of the vat D into the vat G, and the chlorid of silver remaining in the pulp is dissolved in a saturated solution of common salt or in a solution of hyposulfite of an alkali or alkaline earth. If the chlorid of silver is dissolved in the saturated solution of salt, it is then filtered into the precipitating-tank J and then diluted with water until all the chlorid of silver is precipitated. It is then collected and treated in any usual way known to the art to separate the silver as metallic silver. If a hyposulfite-of-soda solution in water is used, one per cent. to five per cent. of hyposulfate and one per cent. to three per cent. of copper sulfate is used as a suitable proportion of solvent materials. After solution it is filtered into the vat J and precipitated as a sulfid by adding a saturated solution of an alkaline sulfid until it does not produce a precipitate. The solvent solution of salt is collected and stored for reuse and the hyposulfite solution also is collected and stored in vats prepared for storing the same for reuse. The pulp remaining in the vat G is then removed by shoveling it through the gate of the vat or by any other means into the settler K or any other similar device used for amalgamation. Then about sixty (60) pounds of mercury to the ton of the powdered dry ore is added to the pulp in the settler K and the remaining coarse gold amalgamated in the usual way. The mercury is then drawn off and the filtered and the remaining amalgam retorted and the pure gold extracted and melted and cast into bullion. The sublimates contained in the condenser C and the condenser d are removed and subsequently treated to separate the values contained in them.

Having fully described our invention, what we claim as new and useful, and desire to secure by Letters Patent, is—

1. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds produced by this treatment, out of the ore and ore-treating receptacle, by passing a current of chlorin gas through the ore and ore-treating receptacle, substantially as described and for the purpose herein set forth.

2. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds and metallic chlorids produced by this treatment, out of the ore and ore-treating receptacle, by passing a rapid current of chlorin gas under superatmospheric pressure through the ore and ore-treating receptacle, substantially as described and for the purpose herein set forth.

3. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds and metallic chlorids produced by this treatment, out of the ore and ore-treating receptacle, by passing a rapid current of chlorin gas under superatmospheric pressure through the ore and ore-treating receptacle; collecting them; condensing them; substantially as described and for the purpose herein set forth.

4. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds and metallic chlorids produced by this treatment, out of the ore and ore-treating receptacle, by passing a rapid current of chlorin gas, under superatmospheric pressure, through the ore and ore-treating receptacle; collecting them; condensing them; then treating the powdered ore with a rapid current of chlorin gas, under superatmospheric pressure, at the temperature of about 360° Fahrenheit, raising it slowly to about 755° Fahrenheit, maintaining the higher degree, continuing the rapid current of chlorin gas, under superatmospheric pressure, for one (1) to three (3) hours, according to the nature of the ore; removing the base-metal chlorids and volatilized chlorid of silver and other volatilized chlorids, produced by this treatment, from the ore and ore-treating receptacle, by passing a rapid current of chlorin gas, under superatmospheric pressure, through the ore and ore-treating receptacle; collecting them; condensing them; collecting, storing for reuse, the excess of chlorin gas used, substantially as described and for the purpose herein set forth.

5. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds and metallic chlorids produced by this treatment, out of the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore with a rapid current of chlorin gas, under superatmospheric pressure, at a temperature of about 360° Fahrenheit, raising it slowly to about 755° Fahrenheit, maintaining the higher degree, continuing the rapid current of chlorin gas, under superatmospheric pressure, for one (1) to three (3) hours, according to the nature of the ore; removing the volatilized base-metal chlorids and volatilized chlorid of silver and other volatilized chlorids, produced by this treatment, from the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore at the temperature of about 755° Fahrenheit, with a current of hot hydrogen gas and superheated steam for one-half (½) hour to remove base-metal compounds, or chlorid of silver, deposited as a film on the precious metals before, or during previous treatment; to remove excess of chlorin gas used in the previous treatment; to prepare the powdered ore for further treatment, substantially as described and for the purpose herein set forth.

6. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids and metalloid compounds and metallic chlorids produced by this treatment, out of the ore, and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore with a rapid current of chlorin gas, under superatmospheric pressure, at a temperature of about 360° Fahrenheit, raising it slowly to about 755° Fahrenheit, maintaining the higher degree, continuing the rapid current of chlorin gas, under superatmospheric pressure, from one (1) to three (3) hours, according to the nature of the ore; removing the volatilized base-metal chlorids and volatilized chlorid of silver and other volatilized chlorids produced by this treatment from the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore at the temperature of about 755° Fahrenheit, with a current of hot hydrogen gas and superheated steam, for one-half (½) hour, to remove base-metal compounds or chlorid of silver deposited as a film on the precious metals before, or during previous treatment; to remove excess of chlorin gas used in the previous treatment; to prepare the powdered ore for further treatment; then treating the powdered ore with hot vapor of mercury, under superatmospheric pressure, for one-half (½) hour to amalgamate floured gold; to prepare coarse gold for further treatment; substantially as described and for the purpose herein set forth.

7. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids, and metalloid compounds and metallic chlorids produced by this treatment, out of the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore with a rapid current of chlorin gas, under superatmospheric pressure, at a temperature of about 360° Fahrenheit, raising it slowly to about 755° Fahrenheit, maintaining the higher degree; continuing the rapid current of chlorin gas, under superatmospheric pressure, from one (1) to three (3) hours, according to the nature of the ore; removing the volatilized base-metal chlorids and chlorid of silver and other volatilized chlorids, produced by this treatment, from the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore at the temperature of about 755° Fahrenheit, with a current of hot hydrogen gas and superheated steam for one-half ($\frac{1}{2}$) hour, to remove base-metal compounds, or chlorid of silver, deposited as a film on the precious metals before, or during previous treatment; to remove excess of chlorin gas used in the previous treatment; to prepare the powdered ore for further treatment; then treating the powdered ore with hot vapor of mercury, under superatmospheric pressure, for one-half ($\frac{1}{2}$) hour to amalgamate floured gold; to prepare coarse gold for further treatment; then treating the powdered ore with water holding free chlorin in solution, whereby the base-metal chlorids and precious-metal chlorids, except chlorid of silver, produced by the previous treatment of the powdered dry ore, not removed by said previous treatment, are dissolved, and removed from the pulp by filtration; then treating the filtrate with sulfid of sodium, whereby the chlorids of the metals in solution are precipitated as sulfids, substantially as described and for the purpose herein set forth.

8. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids, and metalloid compounds and metallic chlorids produced by this treatment, out of the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore with a rapid current of chlorin gas, under superatmospheric pressure, at the temperature of about 360° Fahrenheit, raising it slowly to about 755° Fahrenheit, maintaining the higher degree, continuing the rapid current of chlorin gas, under superatmospheric pressure, for one (1) to three (3) hours, according to the nature of the ore; removing the volatilized base-metal chlorids, and chlorid of silver, and other volatilized chlorids produced by this treatment, from the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore at the temperature of about 755° Fahrenheit, with a current of hot hydrogen gas and superheated steam for one-half ($\frac{1}{2}$) hour, to remove base-metal compounds, or chlorid of silver, deposited as a film on the precious metals before, or during previous treatment; to remove excess of chlorin gas used in the previous treatment; to prepare the powdered ore for further treatment; then treating the powdered ore with hot vapor of mercury, under superatmospheric pressure, for one-half ($\frac{1}{2}$) hour to amalgamate floured gold; to prepare coarse gold for further treatment; then treating the powdered ore with water holding free chlorin in solution; whereby the base-metal chlorids and precious-metal chlorids, except chlorid of silver, produced by the previous treatment of the powdered dry ore, not removed by said previous treatment, are dissolved and removed from the pulp by filtration; then treating the filtrate with a solution of sulfid of sodium; whereby the chlorids of the metals in solution are precipitated as sulfids; then treating the pulp with a solution of hyposulfite of soda; whereby the chlorid of silver contained in the pulp is dissolved; then removing the dissolved chlorid of silver from the pulp by filtration; then precipitating from the filtrate the chlorid of silver with a solution of sulfid of sodium, as sulfid of silver, substantially as described and for the purpose herein set forth.

9. In a process of extracting the precious metals and other values from their ores, extracting the metalloids; removing them from the ore and ore-treating receptacle; consisting in treating the powdered ore with heat, chlorid of sodium, oxygen, nascent chlorin, a current of chlorin gas; volatilizing the metalloids; carrying the volatilized metalloids, and metalloid compounds and metallic chlorids, produced by this treatment, out of the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore with a rapid current of chlorin gas, under superatmospheric pressure, at the temperature of about 360° Fahrenheit, raising it slowly to about 755° Fahrenheit, maintaining the higher degree, continuing the rapid current of chlorin gas, under superatmospheric pressure, for one (1) to three (3) hours, according to the nature of the ore; removing the volatilized base-metal chlorids, and volatilized chlorid of silver, and other volatilized chlorids produced by this treatment, from the ore and ore-treating receptacle, by passing a rapid current of chlorin gas, under superatmospheric pressure, through the ore and ore-treating receptacle; collecting them; condensing them; collecting, storing for reuse the excess of chlorin gas used; then treating the powdered ore at the temperature of about 755° Fahrenheit, with a current of hot hydrogen gas and superheated steam for one-half ($\frac{1}{2}$) hour to remove base-metal compounds, or chlorid of silver, deposited as a film on the precious metals before, or during previous treatment; to remove excess of chlorin gas used in the previous treatment; to prepare the powdered ore for further treatment; then treating the powdered ore with hot vapor of mercury, under superatmospheric pressure, for one-half ($\frac{1}{2}$) hour to amalgamate floured gold; to prepare coarse gold for further treatment; then treating the powdered ore with water holding free chlorin in solution, whereby the base-metal chlorids, and precious-metal chlorids, except chlorid of silver, produced by the previous treatment of the powdered dry ore, not removed by said previous treatment, are dissolved and removed from the pulp by filtration; then treating the filtrate with sulfid of sodium, whereby the chlorids of the metals in solution are precipitated as sulfids; then treating the pulp with a solution of hyposulfite of soda, whereby the chlorid of silver contained in the pulp is dissolved; removing the dissolved chlorid of silver from the pulp by filtration; precipitating from the filtrate the chlorid of silver with a solution of sulfid of sodium, as sulfid of silver; then treating the pulp with mercury in the proportion of sixty (60) pounds of mercury to the ton of the dry powdered ore; drawing off the mercury after amalgamation, filtering it, retorting it, melting the remaining gold and casting it into bullion, substantially as described and for the purpose herein set forth.

JOSEPH WYLIE MAXWELL.
JOHN WILLIAM SAWYER.

Witnesses as to the signature of Joseph Wylie Maxwell:
THOS. LAWSON,
C. C. MCMAHAM.

Witnesses as to the signature of John William Sawyer:
J. M. GRAHAM,
J. C. GLASSFORTH.